Patented Nov. 24, 1936

2,062,072

UNITED STATES PATENT OFFICE 2,062,072

PURIFYING FELDSPAR

Norman G. Smith, Brunswick, and Stanton G. Smith, Auburn, Maine

No Drawing. Application August 11, 1928, Serial No. 299,113

2 Claims. (Cl. 209—215)

The present invention relates to purifying feldspar, and more especially to the removal from feldspar of iron containing elements.

Feldspar is extensively used as an ingredient in the mixes for making ceramic articles and for enamels which are applied to bath room and plumbing fixtures.

The feldspar is usually supplied in a finely ground or powdered condition by the producer for use at the potters' or enameling plants. If there are iron compounds in the feldspar, they result in the discoloration of the final ceramic articles or enamels in which such contaminated feldspar is used. It is therefore important that the high grade prepared feldspar should be practically free from iron-containing compounds. Various attempts have been made by feldspar producers to remove iron compounds from the feldspar, but they have met with little if any practical success.

The usual way in which a pure prepared feldspar, uncontaminated with the objectionable iron, is obtained is to pick out the pieces of uncontaminated feldspar rock and to discard the feldspar which may contain the iron impurities. As a result, a large part of the feldspar as mined is thrown aside.

We have found that feldspar containing the iron-bearing impurities in sufficient quantities so that it is now thrown aside as waste, may be utilized by removing the iron-bearing impurities as herein described.

Feldspar is usually found in rock ledges associated with granite and other rock formations and it appears as small deposits or strata therein. We mine the feldspar rock in the usual way and take the feldspar, including the feldspar which has contaminated ferruginous impurities, and reduce the feldspar rock to a granular condition. This is preferably done by grinding or crushing the rock to a condition like coarse sand or fine gravel. When thus reduced to the coarse sand-like granular condition, the particles which contain the iron compounds break away from the crystals of feldspar to which they have been attached.

The rock is crushed only to the point where the iron-bearing minerals break away from the feldspar. The extent of the crushing may vary from material which will pass through a screen of four meshes to the inch down to material which will pass through a screen of fourteen meshes to the inch. Usually the rock is crushed to the point where the crushed material passes through a screen having ten meshes to the inch. During the crushing of the feldspar into the sand-like condition, considerable fine flour or dust-like material is formed which consists of feldspar and also some of the ferruginous impurities. This dust is preferably removed from the granular material by a fine screen or a wind blast. Usually the fines which will pass through a screen of eighty meshes to the inch are removed. The removal of the dust separates the iron-bearing impurities which have been ground too fine to be properly removed in the next step of the process.

The granular feldspar, still containing the granular particles of the iron-bearing impurities, is next passed through a magnetic separator which removes the ferruginous particles from the granular mass. There are a number of magnetic separators on the market and their construction is well known and they therefore need not be described in detail, except to say that the separation is usually accomplished by passing a thin layer of the material in close proximity to an electromagnet which attracts the iron-bearing particles and removes them from the stream of material.

After the feldspar has been treated in the granular condition to magnetically remove the ferruginous particles therefrom, the purified feldspar is preferably then ground to the usual fine powdered condition in which it is sold to the trade.

The feldspar is usually ground to such fineness that 98% will pass through a screen of 160 meshes to the inch.

We have found that for proper separation of the ferruginous impurities from the feldspar, the feldspar should be in a sand-like granular condition when subjected to the magnetic separation. We use the expression "sand-like granular condition" as a term of general description to define a material having a grain size of the order of that of sand or fine gravel, as distinguished from a finely ground or powdered material. However, the purified feldspar may be sold in its granular condition. If an attempt be made to apply the magnetic separation to the feldspar as ground to its finely powdered condition, the particles containing the iron compounds are so exceedingly small that there is not sufficient magnetic pull exerted on them to move them through the surrounding body of powder, whereas if the particles are of a size like that of a coarse sand or fine gravel, there is enough of the ferruginous material attached to each defective grain so that such grain will respond to the attractive pull of the magnets and be drawn out of the mass as it passes through the magnetic separator.

For this reason, it is preferred to subject the granular material to the dust-removing operation before applying the magnetic separation, since, while the magnetic separation will remove the larger particles containing the ferruginous material, it will not act as satisfactorily to remove the ferruginous material in dust-like form. Therefore, for the production of a high quality purified feldspar for the making of white ceramic ware or enamels, it is preferable to remove the dust before subjecting the granular material to the magnetic separation. Such removal of the dust, of course, removes such of the feldspar as is in the fine dust-like condition. In case the highest degree of iron-free purity is not desired, the dust-removing step may be omitted and the crushed mass containing the granular particles and dust subjected to the magnetic separation, which will remove the larger granules containing the iron compounds and some, but not all, of the very fine iron-containing particles. While the omission of the dust-removing step does not result in as pure a feldspar, it allows the retention of such finely ground feldspar as may be in the dust and produces a feldspar which is sufficiently purified for certain purposes.

The iron may exist as a chemical compound with the impurities or as iron-bearing particles attached to the grains of the impurities. The feldspar sometimes contains mica. This mica usually contains iron or has particles of iron-containing material attached to its grains. The iron-containing mica is usually of a black color, and for that reason is called black mica. It is weakly magnetic. The magnetic separation, therefore, serves to remove such mica from the feldspar.

The operation of the process has been described in connection with the removal of the ferruginous impurities from feldspar, "feldspar" being the generic name ordinarily applied to different varieties of feldspathic minerals. The word "feldspar" as used herein is therefore intended as a term of general description, not of limitation, and to include the feldspathic minerals, in general.

We have found that by the use of our process, it is possible to utilize grades of feldspar which, because of contamination with ferruginous impurities, have heretofore been regarded as waste in the manufacture of feldspar for the ceramic and enamel industries.

While we have specifically described the preferred procedure in carrying out our process, it is to be understood that the invention is not so limited, but may be otherwise practiced within the scope of the following claims.

We claim:

1. The process of purifying feldspar containing feebly magnetic impurities, such as iron-bearing mica, which comprises reducing the feldspar to a sand-like granular condition having a grain size such that the feebly magnetic impurities may be effectively removed by magnetic separation, and subjecting the feldspar while in such granular condition to magnetic separation of said impurities.

2. The process of purifying feldspar containing feebly magnetic impurities, such as iron-bearing mica, which comprises crushing the feldspar to a sand-like granular condition having a grain size such that the feebly magnetic impurities may be effectively removed by magnetic separation, removing the fine dust produced in crushing the feldspar, and thereafter subjecting the feldspar while in such granular condition to magnetic separation of said impurities.

NORMAN G. SMITH.
STANTON G. SMITH.